United States Patent
Neumeier et al.

(10) Patent No.: US 9,094,715 B2
(45) Date of Patent: Jul. 28, 2015

(54) SYSTEMS AND METHODS FOR MULTI-BROADCAST DIFFERENTIATION

(71) Applicants: Zeev Neumeier, Berkeley, CA (US); Michael Collette, San Rafael, CA (US)

(72) Inventors: Zeev Neumeier, Berkeley, CA (US); Michael Collette, San Rafael, CA (US)

(73) Assignee: Cognitive Networks, Inc., San Francisco, CA (US)

( * ) Notice: Subject to any disclaimer, the term of this patent is extended or adjusted under 35 U.S.C. 154(b) by 6 days.

(21) Appl. No.: 14/217,435

(22) Filed: Mar. 17, 2014

(65) Prior Publication Data

US 2014/0201774 A1   Jul. 17, 2014

Related U.S. Application Data

(63) Continuation-in-part of application No. 14/089,003, filed on Nov. 25, 2013, now Pat. No. 8,898,714, and a continuation-in-part of application No. 12/788,721, filed on May 27, 2010, now Pat. No. 8,595,781, and a (Continued)

(51) Int. Cl.
*H04H 60/33* (2008.01)
*H04N 21/44* (2011.01)
*H04N 5/445* (2011.01)
*H04N 21/442* (2011.01)
*H04N 21/45* (2011.01)
*H04N 21/466* (2011.01)
*H04N 21/478* (2011.01)

(52) U.S. Cl.
CPC ..... *H04N 21/44008* (2013.01); *H04N 5/44591* (2013.01); *H04N 21/44204* (2013.01); *H04N 21/4532* (2013.01); *H04N 21/4667* (2013.01); *H04N 21/478* (2013.01)

(58) Field of Classification Search
CPC ............ H04N 21/4622; H04N 21/442; H04N 21/44222
USPC ...................... 725/9, 14, 22, 20, 19
See application file for complete search history.

(56) References Cited

U.S. PATENT DOCUMENTS

| 5,319,453 | A  | * | 6/1994  | Copriviza et al. ................. 346/6 |
| 6,035,177 | A  | * | 3/2000  | Moses et al. ..................... 725/22 |
| 6,463,585 | B1 | * | 10/2002 | Hendricks et al. .............. 725/35 |

(Continued)

*Primary Examiner* — Pankaj Kumar
*Assistant Examiner* — Timothy Newlin
(74) *Attorney, Agent, or Firm* — Puget Patent; Michael Gibbons (57) ABSTRACT

A system and method is disclosed for resolving false positives in a centralized, real-time automatic content recognition system that is ingesting, fingerprinting, and attempting to match for recognition purposes, multiple streams of broadcast content that are simultaneously arriving from a plurality of sources. In particular, the problem of identifying which specific broadcast of certain programming has been matched, including the episode of a series, as well as the channel, time zone and time of broadcast and whether the programming is being watched "live" as broadcast or from a DVR time-shifted source, is addressed. This system and method enables the processing means of any connected TV viewing means to synchronize with a regional automated content recognition (ACR) center with regard to displaying at the correct time certain supplemental information or other media that may be associated with certain programming. It also reduces the probability of a false positive "recognition" of pre-recorded media or broadcasts from other time zones being displayed on the connected TV viewing means, and confusing such programming with the actual media with which the TV viewing device's processing means is intended to count, synchronize, interact with, or supplement.

20 Claims, 8 Drawing Sheets

Related U.S. Application Data continuation-in-part of application No. 12/788,748, filed on May 27, 2010, now Pat. No. 8,769,584, and a continuation-in-part of application No. 14/217,039, filed on Mar. 17, 2014, and a continuation-in-part of application No. 14/217,075, filed on Mar. 17, 2014, and a continuation-in-part of application No. 14/217,094, filed on Mar. 17, 2014, and a continuation-in-part of application No. 14/217,375, filed on Mar. 17, 2014, which is a continuation-in-part of application No. 14/217,425, filed on Mar. 17, 2014.

(60) Provisional application No. 61/791,578, filed on Mar. 15, 2013, provisional application No. 61/290,714, filed on Dec. 29, 2009, provisional application No. 61/182,334, filed on May 29, 2009.

(56) References Cited

U.S. PATENT DOCUMENTS

| | | | |
|---|---|---|---|
| 6,647,548 B1* | 11/2003 | Lu et al. | 725/20 |
| 7,793,318 B2* | 9/2010 | Deng | 725/19 |
| 8,001,571 B1* | 8/2011 | Schwartz et al. | 725/53 |
| 8,522,283 B2* | 8/2013 | Laligand et al. | 725/53 |
| 2002/0026635 A1* | 2/2002 | Wheeler et al. | 725/19 |
| 2004/0045020 A1* | 3/2004 | Witt et al. | 725/13 |
| 2005/0172312 A1* | 8/2005 | Lienhart et al. | 725/19 |
| 2006/0195857 A1* | 8/2006 | Wheeler et al. | 725/15 |
| 2007/0033608 A1* | 2/2007 | Eigeldinger | 725/20 |
| 2007/0094696 A1* | 4/2007 | Sakai | 725/118 |
| 2007/0192782 A1* | 8/2007 | Ramaswamy | 725/9 |
| 2007/0261070 A1* | 11/2007 | Brown et al. | 725/9 |
| 2007/0261075 A1* | 11/2007 | Glasberg et al. | 725/22 |
| 2013/0067523 A1* | 3/2013 | Kamitakahara et al. | 725/96 |
| 2013/0212609 A1* | 8/2013 | Sinha et al. | 725/19 |

* cited by examiner

700 At least one non-transitory computer-readable medium

702 One or more instructions for:

(a) receiving one or more audiovisual data streams and one or more elements of metadata associated with the one or more audiovisual data streams;

(b) storing at least some data related to one or more frames of the one or more audiovisual data streams;

(c) storing, in association with the at least some data related to one or more frames, at least some data related to at least one received element of metadata corresponding to the associated one or more audiovisual datastreams;

(d) receiving one or more fingerprint packages and at least some data associated with signatures from at least one client; and (e) determining, based at least in part on at least one received fingerprint package and at least some of the received data associated with signatures, one or more of a particular program or a particular data stream associated with the at least one client

Fig. 8

800 A system

802 Circuitry configured for receiving one or more audiovisual data streams and one or more elements of metadata associated with the one or more audiovisual data streams 804 Circuitry configured for storing at least some data related to one or more frames of the one or more audiovisual data streams 806 Circuitry configured for storing, in association with the at least some data related to one or more frames, at least some data related to at least one received element of metadata corresponding to the associated one or more audiovisual datastreams 808 Circuitry configured for receiving one or more fingerprint packages and at least some data associated with signatures from at least one client 810 Circuitry configured for determining, based at least in part on at least one received fingerprint package and at least some of the received data associated with signatures, one or more of a particular program or a particular data stream associated with the at least one client

SYSTEMS AND METHODS FOR MULTI-BROADCAST DIFFERENTIATION

PRIORITY CLAIM

This application constitutes a continuation-in-part of U.S. patent application Ser. No. 12/788,721, entitled "METHODS FOR IDENTIFYING VIDEO SEGMENTS AND DISPLAYING CONTEXTUAL TARGETED CONTENT ON A CONNECTED TELEVISION," filed May 27, 2010, and issued Nov. 6, 2013 as U.S. Pat. No. 8,595,781, that application being a non-provisional application claiming priority from U.S. Provisional Patent Application No. 61/182,334, entitled "SYSTEM FOR PROCESSING CONTENT INFORMATION IN A TELEVIDEO SIGNAL," filed May 29, 2009 and being a non-provisional application claiming priority from U.S. Provisional Patent Application No. 61/290,714, entitled "CONTEXTUAL TARGETING BASED ON DATA RECEIVED FROM A TELEVISION SYSTEM," filed Dec. 29, 2009; this application further constitutes a continuation-in-part of U.S. patent application Ser. No. 12/788,748, entitled "METHODS FOR DISPLAYING CONTEXTUALLY TARGETED CONTENT ON A CONNECTED TELEVISION," filed May 27, 2010; this application further constitutes a continuation-in-part of U.S. patent application Ser. No. 14/089,003, entitled "METHODS FOR IDENTIFYING VIDEO SEGMENTS AND DISPLAYING CONTEXTUALLY TARGETED CONTENT ON A CONNECTED TELEVISION," filed Nov. 25, 2013; this application further constitutes a continuation-in-part of U.S. patent application Ser. No. 14/217,039, entitled "SYSTEMS AND METHODS FOR ADDRESSING A MEDIA DATABASE USING DISTANCE ASSOCIATIVE HASHING," filed Mar. 17, 2014; this application further constitutes a continuation-in-part of U.S. patent application Ser. No. 14/217,075, entitled "SYSTEMS AND METHODS FOR IDENTIFYING VIDEO SEGMENTS FOR DISPLAYING CONTEXTUALLY RELEVANT CONTENT," filed Mar. 17, 2014; this application further constitutes a continuation-in-part of U.S. patent application Ser. No. 14/217,094, entitled "SYSTEMS AND METHODS FOR REAL-TIME TELEVISION AD DETECTION USING AN AUTOMATED CONTENT RECOGNITION DATABASE," filed Mar. 17, 2014; this application further constitutes a continuation-in-part of U.S. patent application Ser. No. 14/217,375, entitled "SYSTEMS AND METHODS FOR ON-SCREEN GRAPHICS DETECTION," filed Mar. 17, 2014; this application further constitutes a continuation-in-part of U.S. patent application Ser. No. 14/217,425, entitled "SYSTEMS AND METHODS FOR IMPROVING SERVER AND CLIENT PERFORMANCE IN FINGERPRINT ACR SYSTEMS," filed Mar. 17, 2014; and this application further constitutes a non-provisional application of U.S. Provisional Patent Application No. 61/791,578, entitled "SYSTEMS AND METHODS FOR IDENTIFYING VIDEO SEGMENTS BEING DISPLAYED ON REMOTELY LOCATED TELEVISIONS," filed Mar. 15, 2013. The foregoing applications are either currently co-pending or are applications of which a currently co-pending application is entitled to the benefit of the filing date.

FIELD OF THE INVENTION

This invention generally relates to image recognition, and more particularly, to systems and methods for multi-broadcast differentiation.

BACKGROUND

Advances in programming quantity available to television viewers necessitate a system and methods for differentiating from among multiple broadcasts of a particular program.

SUMMARY

In some embodiments, an exemplary method related to multi-broadcast differentiation may include receiving one or more audiovisual data streams and one or more elements of metadata associated with the one or more audiovisual data streams; storing at least some data related to one or more frames of the one or more audiovisual data streams; storing, in association with the at least some data related to one or more frames, at least some data related to at least one received element of metadata corresponding to the associated one or more audiovisual datastreams; receiving one or more fingerprint packages and at least some data associated with signatures from at least one client; and determining, based at least in part on at least one received fingerprint package and at least some of the received data associated with signatures, one or more of a particular program or a particular data stream associated with the at least one client.

In some embodiments, receiving one or more audiovisual data streams and one or more elements of metadata associated with the one or more audiovisual data streams may include receiving one or more audiovisual data streams and at least one of a network identifier, a satellite feed identifier, a time zone identifier, a local time identifier, a time offset identifier, an on-screen graphic identifier, at least some metadata, or at least some closed-captioning data. In some embodiments, receiving one or more fingerprint packages and at least some data associated with signatures from at least one client may include receiving one or more fingerprint packages and at least one of a geographical location, an IP address, a timestamp, an on-screen graphic identifier, a channel identifier, a cable system identifier, a satellite provider identifier, a time zone identifier, an indication of live programming, an indication of DVR use, at least some metadata, or at least some closed-captioning data.

In some embodiments, determining, based at least in part on at least one received fingerprint package and at least some of the received data associated with signatures, one or more of a particular program or a particular data stream associated with the at least one client may include employing at least one of a scoring algorithm or a probability algorithm to determine one or more of a particular program or a particular data stream associated with the at least one client. In some embodiments, determining, based at least in part on at least one received fingerprint package and at least some of the received data associated with signatures, one or more of a particular program or a particular data stream associated with the at least one client may include retrieving one or more candidates of the particular program and particular data stream and at least one element of metadata associated with the one or more candidates of the particular program and particular data stream; comparing at least some received data associated with signatures with the at least one element of metadata; and determining, based at least partially on the comparison, a particular program and particular data stream which is most likely associated with the client. In some embodiments, determining, based at least partially on the comparison, a particular program and particular data stream which is most likely associated with the client may include assigning a score to each candidate based at least partially on the number of elements of metadata associated with each candidate matching a corresponding received datum associated with a signature; and determining, based at least partially on a highest scoring candidate, a particular program and particular data stream which is most likely associated with the client.

In some embodiments, an exemplary computer program product related to multi-broadcast differentiation may include at least one non-transitory computer-readable medium, and the at least one non-transitory computer-readable medium may include one or more instructions for receiving one or more audiovisual data streams and one or more elements of metadata associated with the one or more audiovisual data streams; one or more instructions for storing at least some data related to one or more frames of the one or more audiovisual data streams; one or more instructions for storing, in association with the at least some data related to one or more frames, at least some data related to at least one received element of metadata corresponding to the associated one or more audiovisual datastreams; one or more instructions for receiving one or more fingerprint packages and at least some data associated with signatures from at least one client; and one or more instructions for determining, based at least in part on at least one received fingerprint package and at least some of the received data associated with signatures, one or more of a particular program or a particular data stream associated with the at least one client.

In some embodiments, an exemplary system related to multi-broadcast differentiation may include circuitry configured for receiving one or more audiovisual data streams and one or more elements of metadata associated with the one or more audiovisual data streams; circuitry configured for storing at least some data related to one or more frames of the one or more audiovisual data streams; circuitry configured for storing, in association with the at least some data related to one or more frames, at least some data related to at least one received element of metadata corresponding to the associated one or more audiovisual datastreams; circuitry configured for receiving one or more fingerprint packages and at least some data associated with signatures from at least one client; and circuitry configured for determining, based at least in part on at least one received fingerprint package and at least some of the received data associated with signatures, one or more of a particular program or a particular data stream associated with the at least one client.

In addition to the foregoing, various other methods, systems and/or program product embodiments are set forth and described in the teachings such as the text (e.g., claims, drawings and/or the detailed description) and/or drawings of the present disclosure.

The foregoing is a summary and thus contains, by necessity, simplifications, generalizations and omissions of detail; consequently, those skilled in the art will appreciate that the summary is illustrative only and is NOT intended to be in any way limiting. Other aspects, embodiments, features and advantages of the device and/or processes and/or other subject matter described herein will become apparent in the teachings set forth herein.

BRIEF DESCRIPTION OF THE DRAWINGS

Certain embodiments of the present invention are described in detail below with reference to the following drawings:

FIG. 3 illustrates a flow chart summarizing the order of the individual steps of the method and how they interrelate.

DETAILED DESCRIPTION

This invention generally relates to the matching of unknown media data, such as video or audio segments, against a massive database of reference media files and, more specifically, resolving false positives due to multiple broadcasts of almost identical programming from different sources or at additional times from the same source or different sources and different times for the same programming content.

Figure 1:
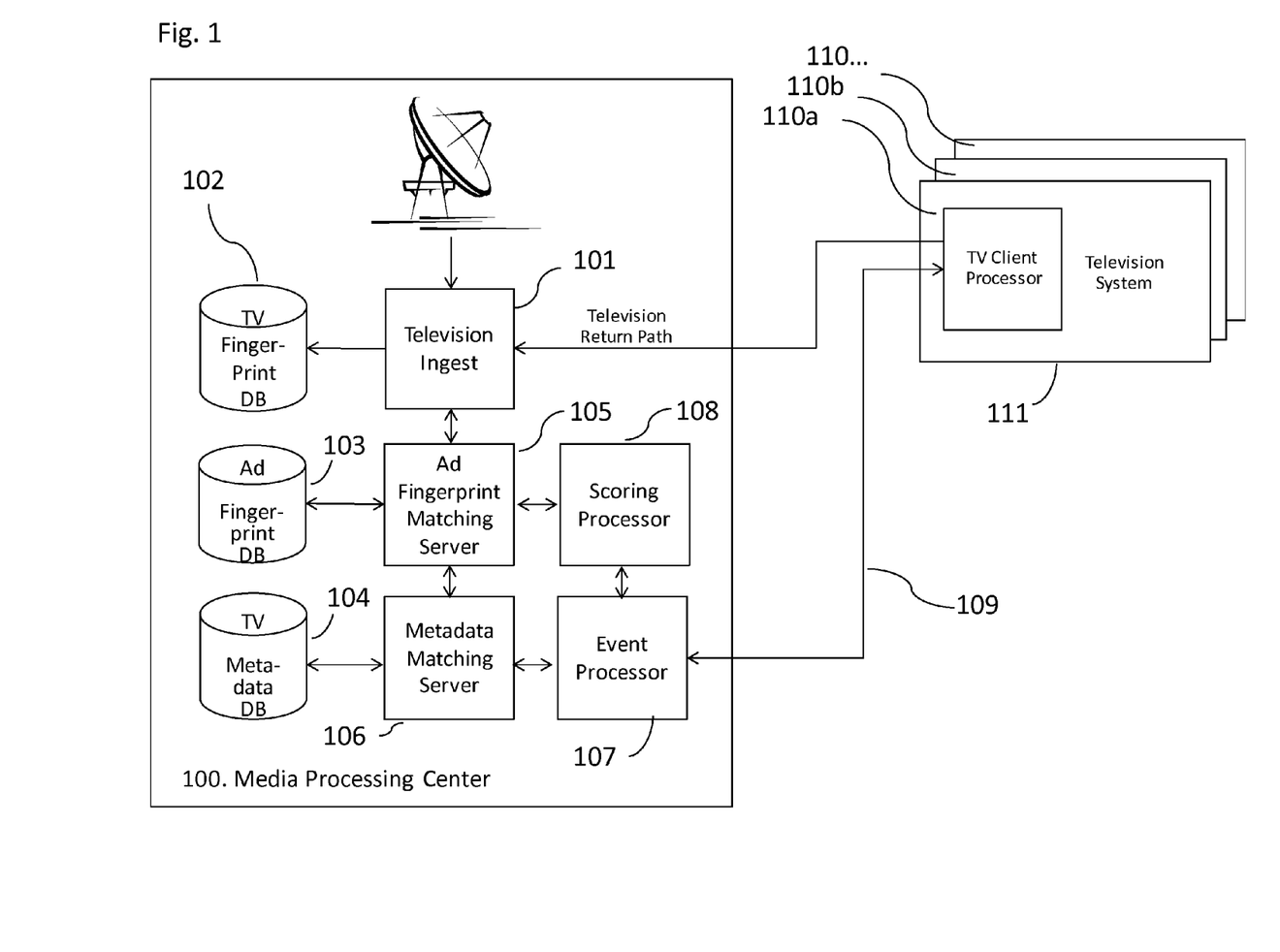
FIG. 1 is a simplified block diagram of one illustrative embodiment of the system and method of this invention.

FIG. 1 is a simplified block diagram of one illustrative embodiment of the system and method of this invention. At a regional media processing center 100 television programming is ingested 101 from various sources. Fingerprints are made and compared to those stored in a database 102. The client processing means associated with each of the plurality of connected TV viewing devices 110a, 110b, 110 ... n takes samples of the programming actually being displayed on that specific viewing monitor at any point in time and sends the fingerprints of those samples to the centralized fingerprint matching server 105 to compare against already existing fingerprints in the databases 102 and 103. It also sends metadata associated with the fingerprints possibly including by way of example location, local clock time, captured logos, information from closed caption capture or other identifying information and it is compared 106 to similar metadata in database 104. Note that for simplicity and ease of explanation, 103 and 104 are shown as separate databases with separate servers. However in certain embodiments, the fingerprint and metadata files associated with the fingerprints may be combined in the same databases and accessed by the same or by a plurality of server means. The scoring processor monitors data from all systems regarding the programming being watched on each of the local display devices including the results of various tests performed on the locally sampled television programming and computes probabilities that the programming is correctly identified. The Event Processor 107 triggers certain actions based on that analysis such as, by way of example, launching local applications generating context sensitive graphics to supplement specific advertisements or other programming.

Figure 2:
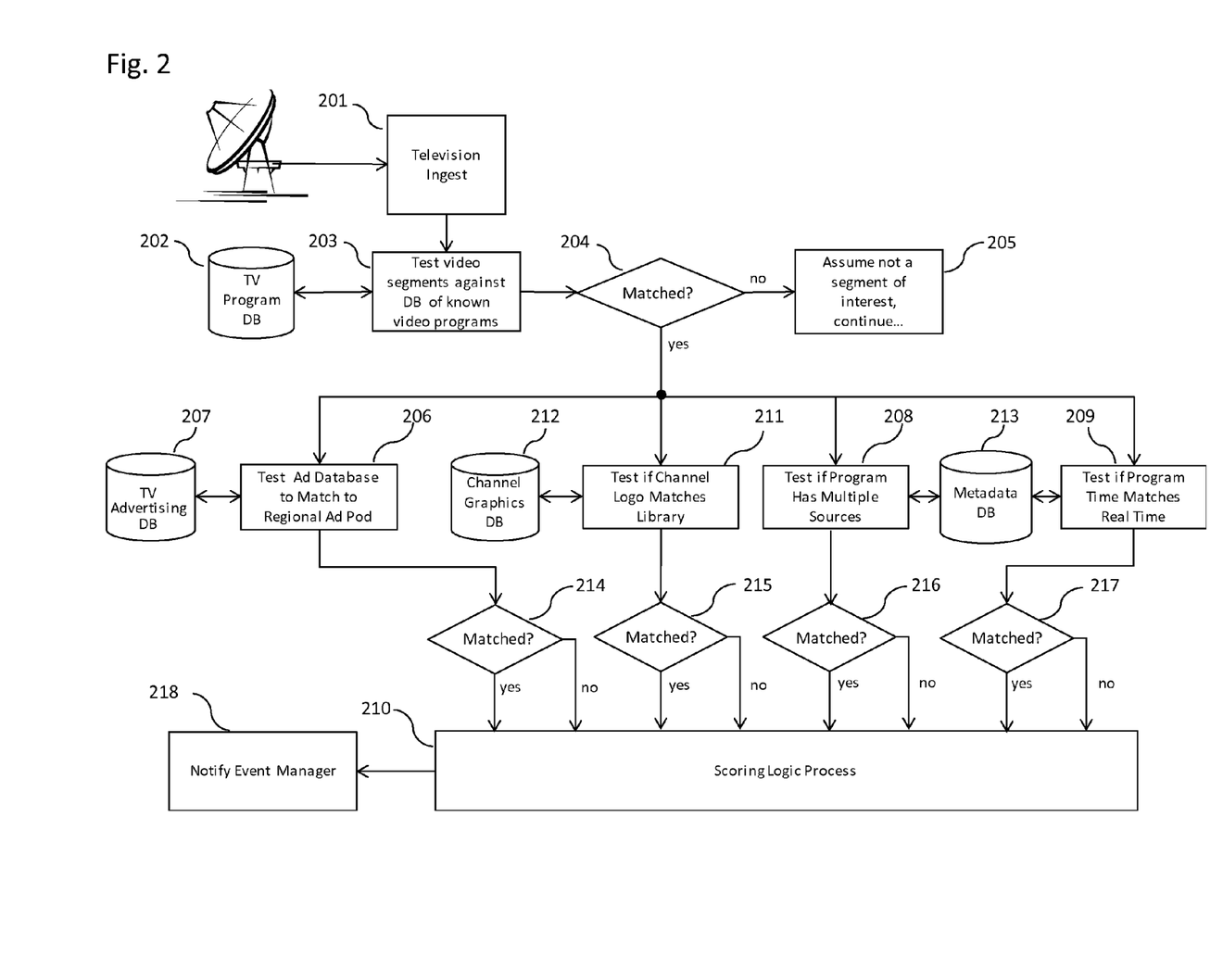
FIG. 2 is a flow chart of one illustrative embodiment of the system and method of this invention that has been simplified to better highlight a possible embodiment of the multi-broadcast differentiation system being disclosed.

FIG. 2 is a flow chart of one illustrative embodiment of the system and method of this invention that has been simplified to better highlight a possible embodiment of the multi-broadcast differentiation system being disclosed. At a regional media processing center (100 in FIG. 1), television programming is ingested 201 from various sources and, following the method of the previous invention of which this is a CIP, is fingerprinted and said fingerprints tested against a database of known programs 202. Once determined to be possibly matching a program of interest, other information is used to remove false positives. For example, advertising is tested 206 against an advertising database 207 to determine if the advertising segments match those expected for the network feed (East Coast or West Coast for example) being sought. Meanwhile, the metadata associated with said fingerprints is tested against a database of such data 213. Such checks can include determining if the program time (time into the program) matches real time 209, and/or determine 211 if the logos overlaid on programming are matches for those of the expected network in database 212. The results of these tests are sent to Scoring Logic Process Manager 210. Note that for simplicity and ease of explanation, 202, 207, 212 and 214 are shown as separate databases, possibly with separate servers. However in certain embodiments, the fingerprint and metadata files associated with the fingerprints may be combined in the same databases and accessed by the same or a plurality of server means and in sequences as a different embodiment than the single example provided here.

Figure 3:
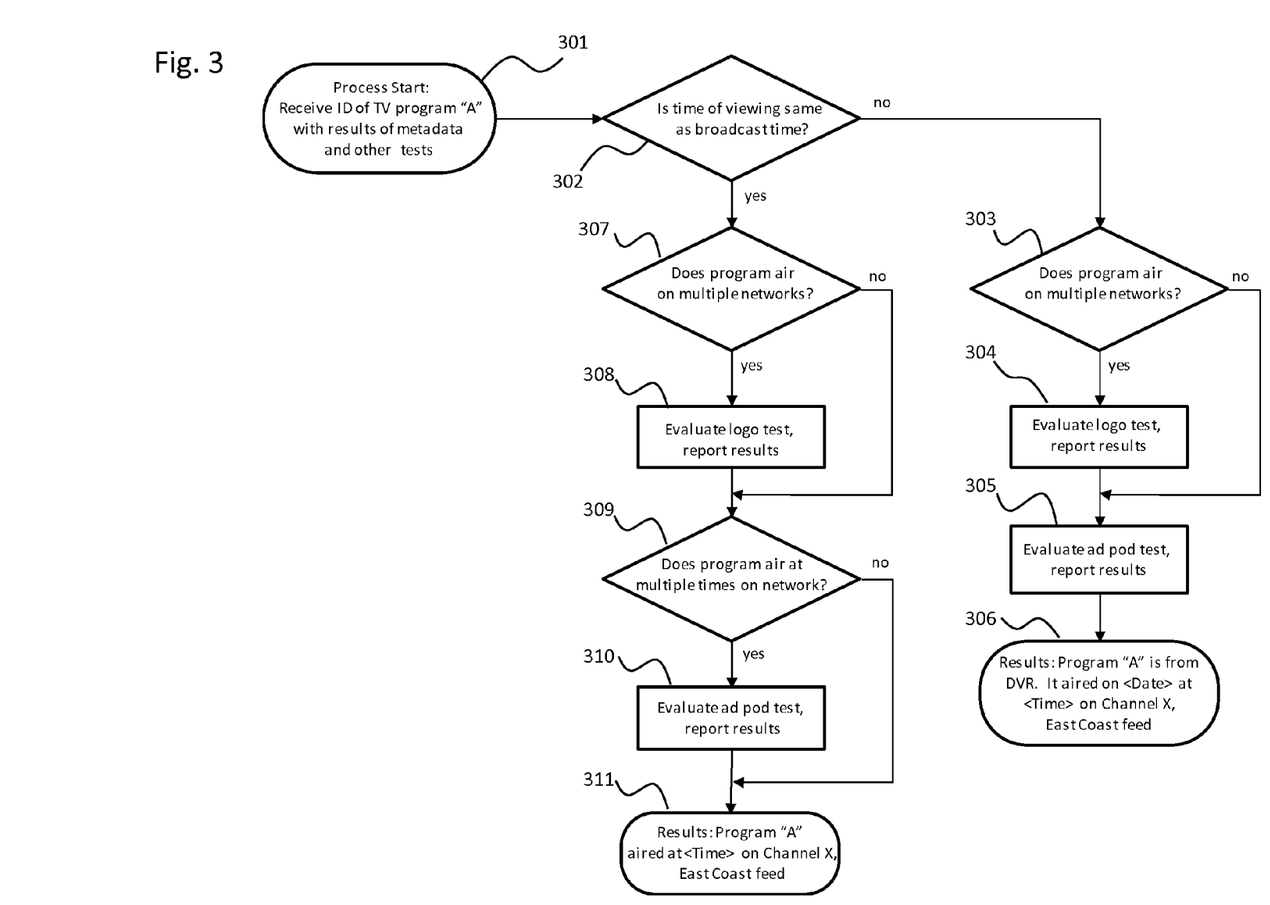
FIG. 3 is a flowchart illustrating the process flow within Scoring Logic 210.

FIG. 3 is a flowchart illustrating the process flow within Scoring Logic 210. In this example, the results of the various tests 301 are acted upon and a logical process followed to determine if the specific programming identified as being displayed on the subject TV viewing system is in fact the actual broadcast that the system of the invention is intended to count, supplement, synchronize with, or otherwise interact with. The viewing time and program running time are tested 302 to see if the program is being viewed in real time or from pre-recorded media such as DVR. If it does not appear "live", the system evaluates 303 if the program is being shown on multiple networks and if so, checks the result of logo capture off the television raster compared logo data base 304 as well as the result of comparing the content of the "ad pod" observed against the expected contents for that channel and time zone 305 which enables a determination of the source of the DVR programming in progress 306. Meanwhile if test 302 suggests "live" real time viewing the result of the database search for other network broadcasts 307 and the check for identifiable channel and network logos 308 is done. The database check for multiple broadcasts of the same episode on a single network 309 is combined with a review of expected ad pods to enable a determination of the specific broadcast including network feed, time zone, and broadcast time is made.

This invention relates to the problem of the identification of certain types of repeating video segments using automated content recognition as taught by the first invention. More specifically, this invention relates to recognizing and correctly identifying specific broadcasts when faced with the problem of looking at multiple broadcasts of the same television programming across a plurality of time zones by one channel provider, or in the case of syndicated programs, by a plurality of channel providers, with said programs being broadcast at the same or varying times. An additional system challenge is differentiating broadcast versions of certain programs from privately-owned, pre-recorded versions such as a DVR or a commercial set of program recordings such as all of one season's episodes of a certain show.

By way of example, there are a large number of popular TV program series that have been produced for various networks. For this example, let us assume it is the TV network called "NBC." The series used for this example is one called "Seinfeld" and it originally ran for nine years for a total of 190 episodes. However, several episodes were initially broadcast without commercials and subsequently edited to different running times to leave room for commercial breaks; and other episodes were re-edited for HDTV meaning that there are potentially over 250 unique versions of episodes of "Seinfeld" that can be viewed on typical home television viewing systems.

Now in syndication, episodes from the example series are still broadcast daily on both cable stations such as TBS as well as a number of local TV stations affiliated with most of the broadcast networks, or from independent stations. Also complicating the recognition problem is the possibility that the programming detected as being displayed on a certain Television display system 111 that matches to the episode of interest from "Seinfeld" that may also be from programming stored on the user's home DVR or possibly from a commercially-boxed DVD releases that have been widely available since 2007.

To continue with this example, we shall assume that on one particular day, a re-run of "Seinfeld" (assume episode 14 of season five entitled "The Marine Biologist") airs on The CW channel (on its East Coast feed at 2:00 am ET. It is then rebroadcast later at 8:00 pm and 11:00 pm ET; also on the CW (East Coast feed). Meanwhile, this same episode also airs on the CW (West Coast feed) at 2:00 am PT (5:00 am ET) and again at 8:00 pm and 11:00 pm PT (2:00 am ET the next day).

Meanwhile, some local affiliates of ABC Networks, for this example, might be broadcasting episodes which may or may not be different from the one broadcast by the CW and broadcast at different times. In addition, other NBC affiliates and independent stations may be broadcasting still others. Also, as noted above, at any point in time there are possible privately-owned commercial free, recordings being watched and some Premium "Pay" channels may also be broadcasting commercial-free versions.

To further continue with the example, assume that a specific television viewing device (FIG. 1 #111) on the West Coast is displaying at 11:12 pm PT certain video programmed identified by the ACR means of the System as a particular episode of "Seinfeld". To fulfil a number of new applications and potential business cases that are enabled by the Invention, the Automatic Content Recognition (ACR) means of the invention, 105 in this example, would be required to identify not only the specific episode of "Seinfeld" being shown, (episode 14 of season five entitled "The Marine Biologist" in this example) it must also determine the source of the content, such as whether it is broadcast or previously recorded, and if broadcast, the network, the network region or the local affiliate channel where the broadcast originated from as well as the time of the broadcast.

This information is needed in order that the client processor system 110 of the client television viewing devices or some other subsystem within the Media Processing Center 100 is suitably enabled to take the actions required of it. For example, if elapsed program time doesn't correlate to the broadcast time, 209, then this is evidence that the recognized programming may be playing locally off a DVR and not a programming segment the system is interested in.

However, if the advertising fingerprints are matched 206 with those in database 207 and are recognized as being regionalized advertising expected from a West Coast feed, this information is sent 214 to the Scoring Logic Process 210 to count in favor of a correct recognition as shown in FIG. 3.

However since the same Seinfeld episode ("The Marine Biologist") might also be playing in the same region on some other channel, the system detects the station logo 215 using algorithms known to those skilled in the art of edge detection in visual media. If the logo matches the network expected 215 then the Scoring Logic Process has narrowed the source down to a West Coast broadcast of Seinfeld episode called "The Marine Biologist."

However, sometimes networks repeat broadcasts, a factor that would be captured by programming scheduling data in the Metadata database 213. Again, ad pods tend to change with time of day and so assessing if the ad pod is as expected, 310 the programming can be identified 311 with high confidence as being the correct episode of the correct program then being broadcast by the channel of interest (The CW channel in this example) on a particular feed and being viewed in real time.

Consequently according to the system and method of the Invention, the Event Manager 218 is then enabled to count, synchronize with, enhance, or otherwise interact with that specific programming or advertisements embedded in it.

One example of a need for this type of determination might be to fulfil differing advertisement placements or commercial message localization or other message localization and enhancement orders from a client for one of the services enabled by the system of the invention where the existing advertisement in the specific programming being currently broadcast may, by contract, need to be replaced with alternative video; or supplemented with additional on-screen graphics or other media.

Such replacement of commercials or their modification with graphic overlays or additional audio could be used to tie the commercial being broadcast to offers that are series or episode-specific, possibly based on ratings or known demographics of the audience that are known to have watched that episode when originally aired, or special offers tied to the time of day or the market, or location where the episode is now being viewed. Additionally the system of the invention enables highly precise measurement of a particular episode's viewing including, for example, time of day, region, network, and associated viewing choices with said measurements made with sample sizes considerable larger than other audience viewing metrics systems.

Therefore, in addition to using the ACR means of the invention to identify the specific episode of the series being displayed, including other data such as the elapsed time into the episode (also called program time) compared to real time or clock time 213, the presence of specific video segments of interest in the programming that may be modified or replaced, the system of the invention may also use a novel combination of approaches, to identify the specific source of the programming that the TV display means is then showing. These means might include the geographic location of said television device, local time-of-day, network logo detection, or closed captioning information.

For contextually-related software applications of the invention being locally implemented on the TV client processor 110, when the television advertisements being inserted to run with the programming are different on the West Coast network feeds from those on the East Coast, and, as in the current example, the system is ingesting the West Coast feeds of said programmer, the system of the invention will detect the advertisements unique to the West Coast feed and, hence, know that the matched video is from a West Coast feed.

Another means of detection is to keep both East and West coast versions of a TV program and wait for one of them to be slightly different.

Figure 4:
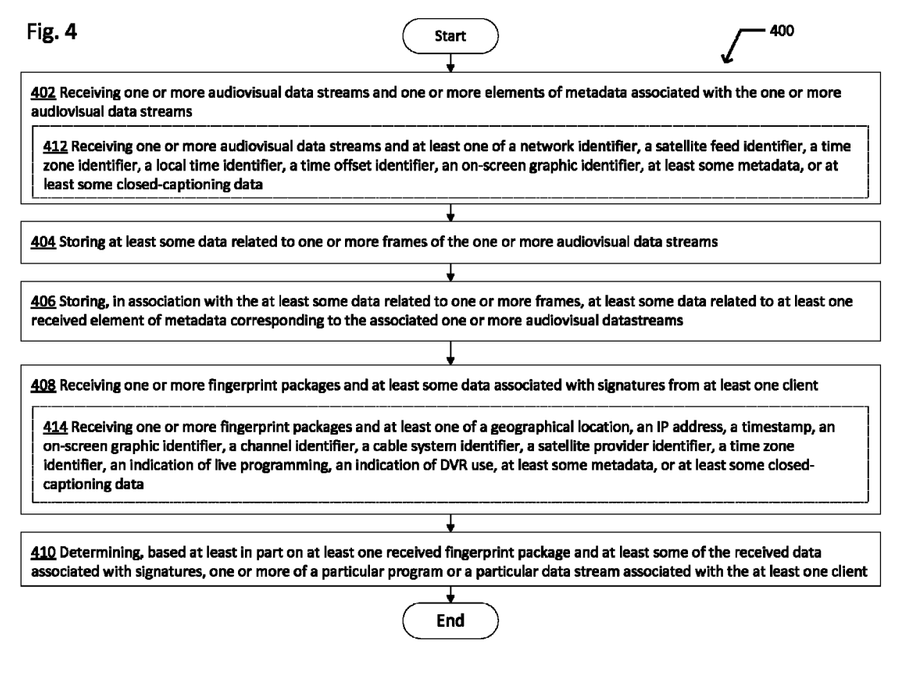
FIG. 4 illustrates an operational flow representing example operations related to multi-broadcast differentiation.

FIG. 4 illustrates an operational flow 400 representing example operations related to on-screen graphics detection. In FIG. 4 and in following figures that include various examples of operational flows, discussion and explanation may be provided with respect to the above-described examples of FIGS. 1 through 3, and/or with respect to other examples and contexts. However, it should be understood that the operational flows may be executed in a number of other environments and contexts, and/or in modified versions of FIGS. 1 through 3. Also, although the various operational flows are presented in the sequence(s) illustrated, it should be understood that the various operations may be performed in other orders than those which are illustrated, or may be performed concurrently.

After a start operation, the operational flow 400 moves to operation 402. Operation 402 depicts receiving one or more audiovisual data streams and one or more elements of metadata associated with the one or more audiovisual data streams. For example, as shown in and/or described with respect to FIGS. 1 through 3.

Then, operation 404 depicts storing at least some data related to one or more frames of the one or more audiovisual data streams. For example, as shown in and/or described with respect to FIGS. 1 through 3.

Then, operation 406 depicts storing, in association with the at least some data related to one or more frames, at least some data related to at least one received element of metadata corresponding to the associated one or more audiovisual datastreams. For example, as shown in and/or described with respect to FIGS. 1 through 3.

Then, operation 408 depicts receiving one or more fingerprint packages and at least some data associated with signatures from at least one client. For example, as shown in and/or described with respect to FIGS. 1 through 3.

Then, operation 410 depicts determining, based at least in part on at least one received fingerprint package and at least some of the received data associated with signatures, one or more of a particular program or a particular data stream associated with the at least one client. For example, as shown in and/or described with respect to FIGS. 1 through 3.

FIG. 4 also illustrates alternative embodiments of the example operational flow 400. FIG. 4 illustrates an example embodiment where operation 402 may include at least one additional operation 412. FIG. 4 also illustrates an example embodiment where operation 408 may include at least one additional operation 414.

Operation 412 illustrates receiving one or more audiovisual data streams and at least one of a network identifier, a satellite feed identifier, a time zone identifier, a local time identifier, a time offset identifier, an on-screen graphic identifier, at least some metadata, or at least some closed-captioning data. For example, as shown in and/or described with respect to FIGS. 1 through 3.

Operation 414 receiving one or more fingerprint packages and at least one of a geographical location, an IP address, a timestamp, an on-screen graphic identifier, a channel identifier, a cable system identifier, a satellite provider identifier, a time zone identifier, an indication of live programming, an indication of DVR use, at least some metadata, or at least some closed-captioning data. For example, as shown in and/or described with respect to FIGS. 1 through 3.

Figure 5:
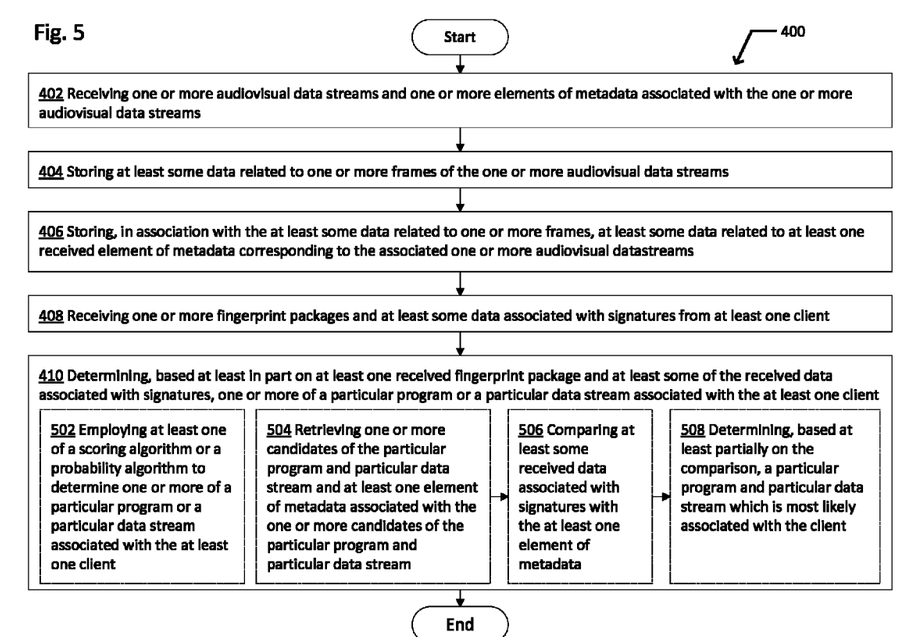
FIG. 5 illustrates an alternative embodiment of the operational flow of FIG. 4.

FIG. 5 illustrates alternative embodiments of the example operational flow 400 of FIG. 4. FIG. 5 illustrates an example embodiment where operation 410 may include at least one additional operation. Additional operations may include operation 502, operation 504, operation 506, and/or operation 508.

Operation 502 illustrates employing at least one of a scoring algorithm or a probability algorithm to determine one or more of a particular program or a particular data stream associated with the at least one client. For example, as shown in and/or described with respect to FIGS. 1 through 3.

Operation 504 illustrates retrieving one or more candidates of the particular program and particular data stream and at least one element of metadata associated with the one or more candidates of the particular program and particular data stream. For example, as shown in and/or described with respect to FIGS. 1 through 3.

Operation 506 illustrates comparing at least some received data associated with signatures with the at least one element of metadata. For example, as shown in and/or described with respect to FIGS. 1 through 3.

Operation 508 illustrates determining, based at least partially on the comparison, a particular program and particular data stream which is most likely associated with the client. For example, as shown in and/or described with respect to FIGS. 1 through 3.

Figure 6:
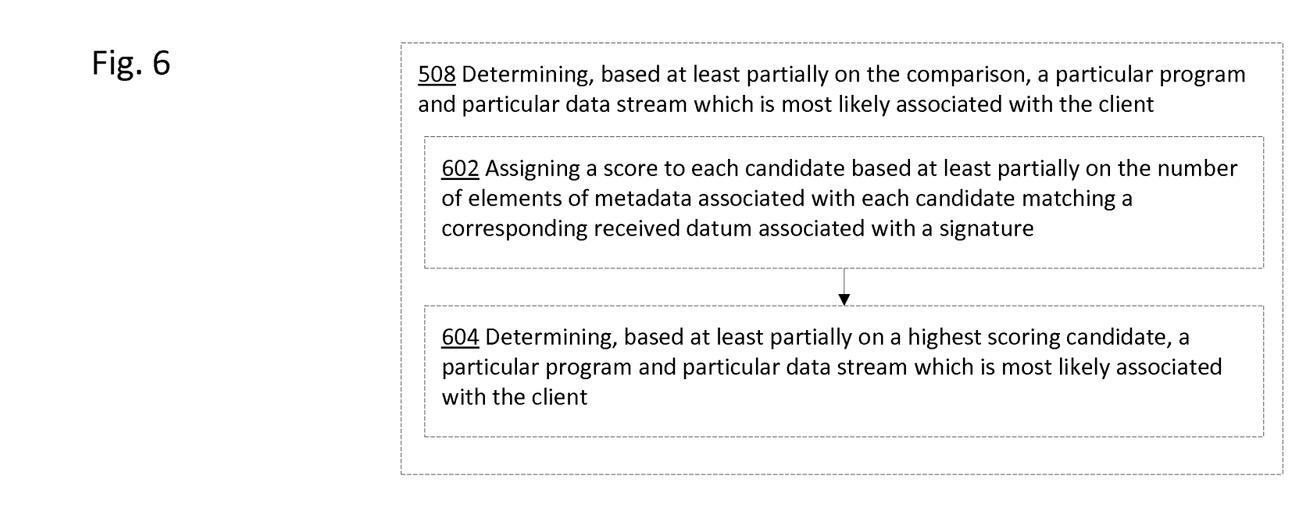
FIG. 6 illustrates an alternative embodiment of the operational flow of FIG. 4.

FIG. 6 illustrates alternative embodiments of the example operational flow 400 of FIG. 4. FIG. 6 illustrates an example embodiment where operation 508 may include at least one additional operation. Additional operations may include operation 602 and/or operation 604.

Operation 602 illustrates assigning a score to each candidate based at least partially on the number of elements of metadata associated with each candidate matching a corresponding received datum associated with a signature. For example, as shown in and/or described with respect to FIGS. 1 through 3.

Operation 604 illustrates determining, based at least partially on a highest scoring candidate, a particular program and particular data stream which is most likely associated with the client. For example, as shown in and/or described with respect to FIGS. 1 through 3.

Figure 7:
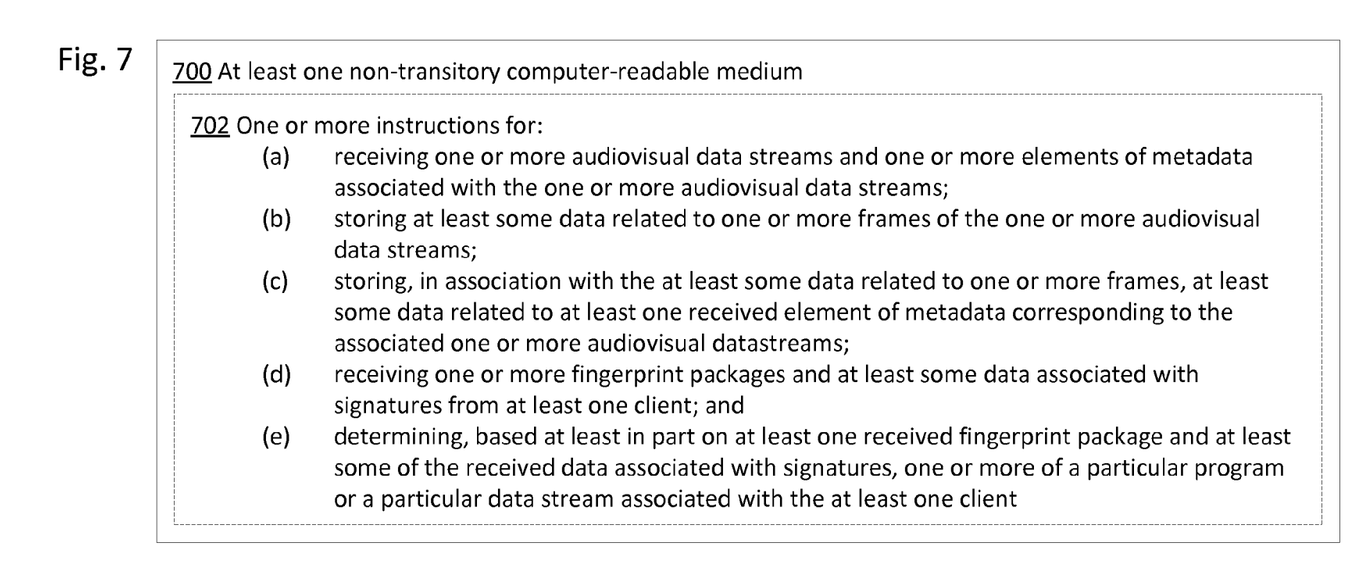
FIG. 7 illustrates an exemplary computer program product related to improving server and client performance in fingerprint ACR systems.

FIG. 7 illustrates an exemplary computer program product 700 which may include at least one non-transitory computer-readable medium. Further illustrated in FIG. 7 are instructions 702 of computer program product 700. Instructions 702 one or more instructions for receiving one or more audiovisual data streams and one or more elements of metadata associated with the one or more audiovisual data streams; one or more instructions for storing at least some data related to one or more frames of the one or more audiovisual data streams; one or more instructions for storing, in association with the at least some data related to one or more frames, at least some data related to at least one received element of metadata corresponding to the associated one or more audiovisual datastreams; one or more instructions for receiving one or more fingerprint packages and at least some data associated with signatures from at least one client; and one or more instructions for determining, based at least in part on at least one received fingerprint package and at least some of the received data associated with signatures, one or more of a particular program or a particular data stream associated with the at least one client. For example, as shown in and/or described with respect to FIGS. 1 through 6, a computer program product may include one or more instructions encoded on and/or stored by one or more non-transitory computer-readable media. The one or more instructions may, when executed by one or more processing devices, cause the one or more processing devices to perform operations including detecting one or more graphics superimposed over a content rendered on a display of a television; and providing at least some data associated with the detected one or more graphics to at least one content recognition operation configured for at least determining one or more identifiers associated with the content being rendered. The foregoing operations may be similar at least in part and/or be substantially similar to (but are not limited to) corresponding operations disclosed elsewhere herein.

Figure 8:
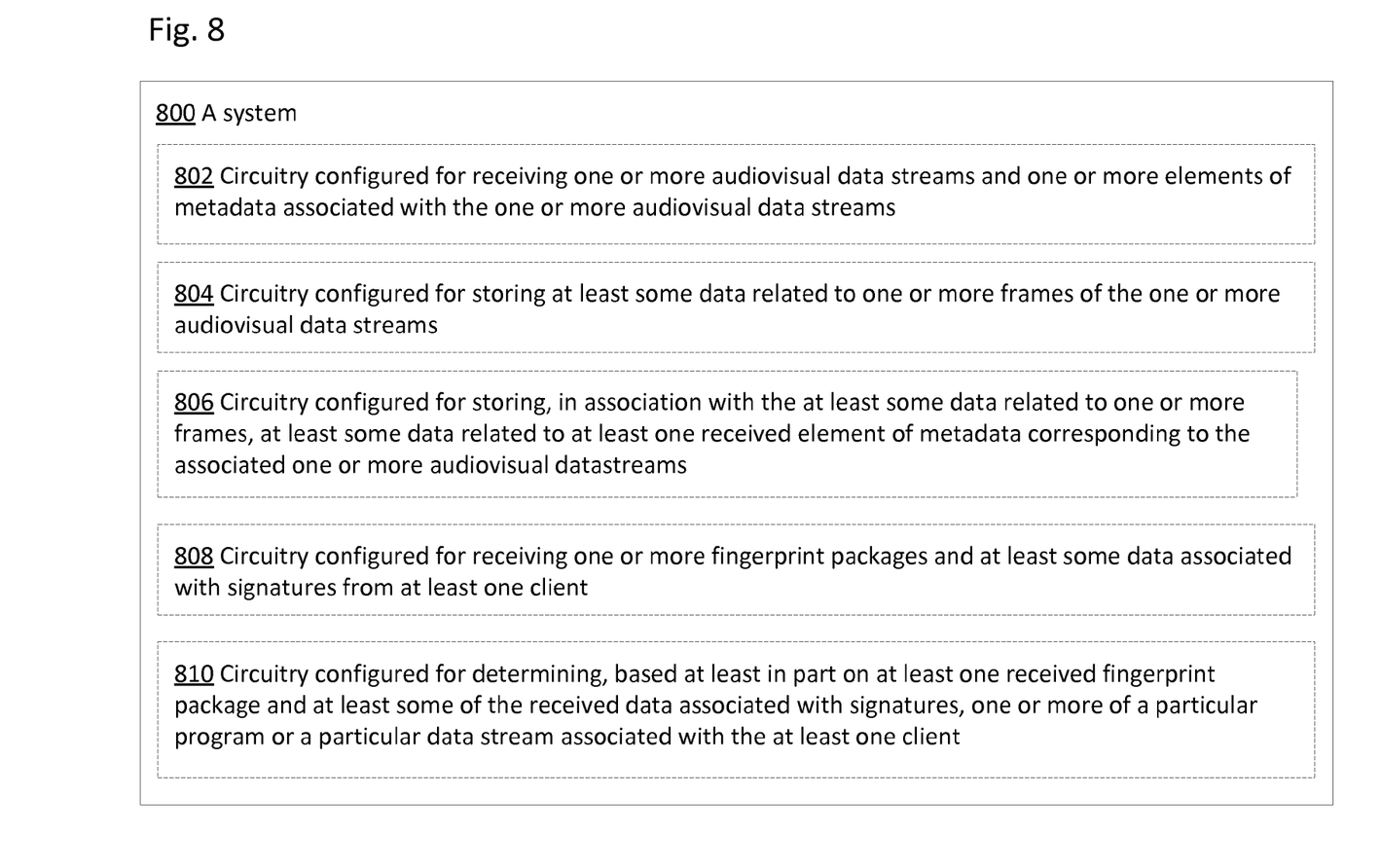
FIG. 8 illustrates a system related to improving server and client performance in fingerprint ACR systems.

FIG. 8 illustrates an exemplary system 800. System 800 may include circuitry 802, circuitry 804, circuitry 806, circuitry 808, and/or circuitry 810.

Circuitry 802 illustrates circuitry configured for receiving one or more audiovisual data streams and one or more elements of metadata associated with the one or more audiovisual data streams. For example, as shown in and/or described with respect to FIGS. 1 through 6, circuitry 802 may cause operations with an effect similar at least in part and/or substantially similar to (but not limited to) corresponding operations disclosed elsewhere herein.

Then, circuitry 804 illustrates circuitry configured for storing at least some data related to one or more frames of the one or more audiovisual data streams. For example, as shown in and/or described with respect to FIGS. 1 through 6, circuitry 804 may cause operations with an effect similar at least in part and/or substantially similar to (but not limited to) corresponding operations disclosed elsewhere herein.

Then, circuitry 806 illustrates circuitry configured for storing, in association with the at least some data related to one or more frames, at least some data related to at least one received element of metadata corresponding to the associated one or more audiovisual datastreams. For example, as shown in and/or described with respect to FIGS. 1 through 6, circuitry 804 may cause operations with an effect similar at least in part and/or substantially similar to (but not limited to) corresponding operations disclosed elsewhere herein.

Then, circuitry 808 illustrates circuitry configured for receiving one or more fingerprint packages and at least some data associated with signatures from at least one client. For example, as shown in and/or described with respect to FIGS. 1 through 6, circuitry 804 may cause operations with an effect similar at least in part and/or substantially similar to (but not limited to) corresponding operations disclosed elsewhere herein.

Then, circuitry 810 illustrates circuitry configured for determining, based at least in part on at least one received fingerprint package and at least some of the received data associated with signatures, one or more of a particular program or a particular data stream associated with the at least one client. For example, as shown in and/or described with respect to FIGS. 1 through 6, circuitry 804 may cause operations with an effect similar at least in part and/or substantially similar to (but not limited to) corresponding operations disclosed elsewhere herein.

The operations by which the video segment is determined may include operations described in a parent application, U.S. patent application Ser. No. 12/788,721 (now U.S. Pat. No. 8,595,781), "METHODS FOR IDENTIFYING VIDEO SEGMENTS AND DISPLAYING CONTEXTUAL TARGETED CONTENT ON A CONNECTED TELEVISION" ("the '781 patent") and/or in related U.S. patent application Ser. No. 14/217,039 (now U.S. Pat. No. 9,055,335), "SYSTEMS AND METHODS FOR ADDRESSING A MEDIA DATABASE USING DISTANCE ASSOCIATIVE HASHING" ("the '335 paent") filed concurrently with the instant application.

The system and methods, flow diagrams, and structure block diagrams described in this specification may be implemented in computer processing systems including program code comprising program instructions that are executable by a computer processing system. Other implementations may also be used. Additionally, the flow diagrams and structure block diagrams herein described describe particular methods and/or corresponding acts in support of steps and corresponding functions in support of disclosed structural means, may also be utilized to implement corresponding software structures and algorithms, and equivalents thereof.

Embodiments of the subject matter described in this specification can be implemented as one or more computer program products, i.e., one or more modules of computer program instructions encoded on a tangible program carrier for execution by, or to control the operation of, data processing apparatus. The computer readable medium can be a machine readable storage device, a machine readable storage substrate, a memory device, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a suitable communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Processors suitable for the execution of a computer program include, by way of example only and without limitation, both general and special purpose microprocessors, and any one or more processors of any kind of digital computer. Generally, a processor will receive instructions and data from a read only memory or a random access memory or both.

To provide for interaction with a user or manager of the system described herein, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. For example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes back end component(s) including one or more data servers, or that includes one or more middleware components such as application servers, or that includes a front end component such as a client computer having a graphical user interface or a Web browser through which a user or administrator can interact with some implementations of the subject matter described is this specification, or any combination of one or more such back end, middleware, or front end components. The components of the system can be interconnected by any form or medium of digital data communication, such as a communication network. The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A method, comprising:
   maintaining at least one database utilized for identifying at least one particular broadcast of a specific program, including at least:
   creating one or more fingerprints associated with one or more ingested audiovisual data streams;
   identifying at least one known program based at least partially on testing at least one fingerprint associated with at least one ingested audiovisual data stream against a database of known programs;
   associating the identified at least one known program with at least one particular broadcast of the at least one known program based at least partially on one or more elements of metadata associated with the at least one ingested audiovisual data stream; and
   storing at least (i) at least one identifier of the at least one known program, (ii) at least one identifier of the particular broadcast of the at least one known program, (iii) at least some fingerprints related to the at least one ingested audiovisual data stream, and (iv) at least some data related to the one or more elements of metadata associated with the at least one ingested audiovisual data stream;

receiving one or more fingerprint packages and at least some data associated with signatures from at least one client;

preparing at least one query of the at least one database based at least partially on at least a portion of at least one received fingerprint package and at least some of the received data associated with signatures; and determining, based at least partially on the at least one prepared database query, one or more of a particular broadcast of a specific program associated with a video buffer of the at least one client or a particular audiovisual data stream associated with the video buffer of the at least one client.

2. The method of claim 1, wherein associating the identified at least one known program with at least one particular broadcast of the at least one known program based at least partially on one or more elements of metadata associated with the at least one ingested audiovisual data stream comprises:

associating the identified at least one known program with at least one particular broadcast of the at least one known program based at least partially on at least one of a network identifier, a satellite feed identifier, a time zone identifier, a local time identifier, a time offset identifier, an on-screen graphic identifier, or at least some closed-captioning data associated with the at least one ingested audiovisual data stream.

3. The method of claim 1, wherein receiving one or more fingerprint packages and at least some data associated with signatures from at least one client comprises:

receiving one or more fingerprint packages and at least one of a geographical location, an IP address, a timestamp, an on-screen graphic identifier, a channel identifier, a cable system identifier, a satellite provider identifier, a time zone identifier, an indication of live programming, an indication of DVR use, at least some metadata, or at least some closed-captioning data from the at least one client, the received one or more fingerprint packages at least partially transported from the at least one client via the Internet.

4. The method of claim 1, wherein determining, based at least partially on the at least one prepared database query, one or more of a particular broadcast of a specific program associated with a video buffer of the at least one client or a particular audiovisual data stream associated with the video buffer of the at least one client comprises:

employing at least one of a scoring algorithm or a probability algorithm in conjunction with the at least one prepared database query to determine the one or more of a particular broadcast of a specific program associated with a video buffer of the at least one client or a particular audiovisual data stream associated with the video buffer of the at least one client.

5. The method of claim 1, wherein determining, based at least partially on the at least one prepared database query, one or more of a particular broadcast of a specific program associated with a video buffer of the at least one client or a particular audiovisual data stream associated with the video buffer of the at least one client comprises:

retrieving one or more candidates of the particular broadcast of a specific program and at least one element of metadata associated with the one or more candidates of the particular broadcast of a specific program based at least partially on the at least one prepared database query;

comparing at least some received data associated with signatures with the at least one element of metadata; and determining, based at least partially on the comparison, one or more of a particular broadcast of a specific program or a particular audiovisual data stream most likely associated with the video buffer of the at least one client.

6. The method of claim 5, wherein determining, based at least partially on the comparison, one or more of a particular broadcast of a specific program or a particular audiovisual data stream most likely associated with the video buffer of the at least one client comprises:

assigning a score to each candidate based at least partially on the number of elements of metadata associated with each candidate matching a corresponding received datum associated with a signature; and determining, based at least partially on a highest scoring candidate, one or more of a particular broadcast of a specific program or a particular audiovisual data stream most likely associated with the video buffer of the at least one client.

7. The method of claim 1, wherein creating one or more fingerprints associated with one or more ingested audiovisual data streams comprises:

creating one or more fingerprints associated with one or more ingested audiovisual data streams, the one or more fingerprints determined using at least some pixel data associated with the one or more ingested audiovisual data streams.

8. The method of claim 1, wherein receiving one or more fingerprint packages and at least some data associated with signatures from at least one client comprises:

receiving one or more fingerprint packages and at least some data associated with signatures from at least one client, the received one or more fingerprint packages including at least some data derived from video buffer pixel data of the at least one client.

9. The method of claim 1, wherein creating one or more fingerprints associated with one or more ingested audiovisual data streams and receiving one or more fingerprint packages and at least some data associated with signatures from at least one client comprise:

creating one or more fingerprints associated with one or more ingested audiovisual data streams, the one or more fingerprints determined using at least some pixel data associated with the one or more ingested audiovisual data streams; and receiving one or more fingerprint packages and at least some data associated with signatures from at least one client, the received one or more fingerprint packages including at least some data derived from video buffer pixel data of the at least one client.

10. The method of claim 1, wherein receiving one or more fingerprint packages and at least some data associated with signatures from at least one client comprises:

receiving one or more fingerprint packages and at least some data associated with signatures from at least one client, the received one or more fingerprint packages transported from the at least one client at least partially via the Internet.

11. The method of claim 1, wherein receiving one or more fingerprint packages and at least some data associated with signatures from at least one client comprises:

receiving one or more fingerprint packages and at least some data associated with signatures from at least one client, the received one or more fingerprint packages including at least some data derived from video buffer pixel data of the at least one client and transported from the at least one client at least partially via the Internet.

12. The method of claim 1, further comprising:
preparing one or more triggers for transport at least partially via the internet to at least one client at least partially based on the determined one or more of a particular broadcast of a specific program associated with a video buffer of the at least one client or a particular audiovisual data stream associated with the video buffer of the at least one client, the prepared one or more triggers capable of initiating at least one context-sensitive action on the at least one client.

13. The method of claim 1, wherein associating the identified at least one known program with at least one particular broadcast of the at least one known program based at least partially on one or more elements of metadata associated with the at least one ingested audiovisual data stream comprises:
associating the identified at least one known program with at least one particular broadcast of the at least one known program by at least one particular network based at least partially on at least one search of at least one channel graphics database using at least one logo overlaid on the at least one ingested audiovisual data stream.

14. The method of claim 1, wherein associating the identified at least one known program with at least one particular broadcast of the at least one known program based at least partially on one or more elements of metadata associated with the at least one ingested audiovisual data stream comprises:
associating the identified at least one known program with at least one particular broadcast of the at least one known program by at least one particular network based at least partially on at least one search of at least one channel graphics database using at least one logo overlaid on the at least one ingested audiovisual data stream and retrieving at least one identifier of at least one network at least partially based on matching the at least one logo in the at least one channel graphics database.

15. The method of claim 1, wherein preparing at least one query of the at least one database based at least partially on at least a portion of at least one received fingerprint package and at least some of the received data associated with signatures comprises:
preparing at least one query of the at least one database based at least partially on at least a portion of at least one received fingerprint package and at least some data related to at least one logo overlaid on at least one frame of the video buffer of the at least one client.

16. The method of claim 1, wherein determining, based at least partially on the at least one prepared database query, one or more of a particular broadcast of a specific program associated with a video buffer of the at least one client or a particular audiovisual data stream associated with the video buffer of the at least one client comprises:
determining, based at least partially on at least one search of at least one channel graphics database using at least some data related to at least one logo overlaid on at least one frame of the video buffer of the at least one client, one or more of a particular broadcast of a specific program associated with a video buffer of the at least one client or a particular audiovisual data stream associated with the video buffer of the at least one client.

17. The method of claim 1, wherein preparing at least one query of the at least one database based at least partially on at least a portion of at least one received fingerprint package and at least some of the received data associated with signatures comprises:
preparing at least one query of the at least one database based at least partially on at least a portion of at least one received fingerprint package and at least some received data related to at least one ad pod displayed by the at least one client.

18. The method of claim 1, wherein determining, based at least partially on the at least one prepared database query, one or more of a particular broadcast of a specific program associated with a video buffer of the at least one client or a particular audiovisual data stream associated with the video buffer of the at least one client comprises:
determining, based at least partially on at least one search of at least one television advertising database using at least some received data related to at least one ad pod displayed by the at least one client, one or more of a particular broadcast of a specific program associated with a video buffer of the at least one client or a particular audiovisual data stream associated with the video buffer of the at least one client.

19. A machine, comprising:
means for maintaining at least one database utilized for identifying at least one particular broadcast of a specific program, including at least:
means for creating one or more fingerprints associated with one or more ingested audiovisual data streams;
means for identifying at least one known program based at least partially on testing at least one fingerprint associated with at least one ingested audiovisual data stream against a database of known programs;
means for associating the identified at least one known program with at least one particular broadcast of the at least one known program based at least partially on one or more elements of metadata associated with the at least one ingested audiovisual data stream; and
means for storing at least (i) at least one identifier of the at least one known program, (ii) at least one identifier of the particular broadcast of the at least one known program, (iii) at least some fingerprints related to the at least one ingested audiovisual data stream, and (iv) at least some data related to the one or more elements of metadata associated with the at least one ingested audiovisual data stream;
means for receiving one or more fingerprint packages and at least some data associated with signatures from at least one client;
means for preparing at least one query of the at least one database based at least partially on at least a portion of at least one received fingerprint package and at least some of the received data associated with signatures; and
means for determining, based at least partially on the at least one prepared database query, one or more of a particular broadcast of a specific program associated with a video buffer of the at least one client or a particular audiovisual data stream associated with the video buffer of the at least one client.

20. A system, comprising:
circuitry configured for maintaining at least one database utilized for identifying at least one particular broadcast of a specific program, including at least:
circuitry configured for creating one or more fingerprints associated with receiving one or more ingested audiovisual data streams;

circuitry configured for identifying at least one known program based at least partially on testing at least one fingerprint associated with at least one ingested audiovisual data stream against a database of known programs;

circuitry configured for associating the identified at least one known program with at least one particular broadcast of the at least one known program based at least partially on one or more elements of metadata associated with the at least one ingested audiovisual data stream;

circuitry configured for storing at least (i) at least one identifier of the at least one known program, (ii) at least one identifier of the particular broadcast of the at least one known program, (iii) at least some fingerprints related to the at least one ingested audiovisual data stream, and (iv) at least some data related to the one or more elements of metadata associated with the at least one ingested audiovisual data stream;

circuitry configured for receiving one or more fingerprint packages and at least some data associated with signatures from at least one client;

circuitry configured for preparing at least one query of the at least one database based at least partially on at least a portion of at least one received fingerprint package and at least some of the received data associated with signatures; and circuitry configured for determining, based at least partially on the at least one prepared database query, one or more of a particular broadcast of a specific program associated with a video buffer of the at least one client or a particular audiovisual data stream associated with the video buffer of the at least one client.

\* \* \* \* \*